United States Patent [19]

Hashimoto et al.

[11] 4,322,032
[45] Mar. 30, 1982

[54] THERMALLY RESPONSIVE VALVE DEVICE

[75] Inventors: Nobuyuki Hashimoto; Atsushi Satomoto, both of Toyota, Japan

[73] Assignee: Aisin Seiki Kabushiki Kaisha, Kariya, Japan

[21] Appl. No.: 152,967

[22] Filed: May 23, 1980

[30] Foreign Application Priority Data

May 28, 1979 [JP] Japan .................... 54-065813

[51] Int. Cl.³ .......................................... G05D 23/10
[52] U.S. Cl. ................................... 236/48 R; 236/87; 236/101 C
[58] Field of Search .................... 236/48 R, 87, 101 C

[56] References Cited

U.S. PATENT DOCUMENTS

| | | | |
|---|---|---|---|
| 4,032,068 | 6/1977 | Luchtenberg et al. | 236/34.5 |
| 4,117,976 | 10/1978 | Doherty, Jr. | 236/48 R |
| 4,144,998 | 3/1979 | Wakabayashi et al. | 236/48 R |
| 4,182,485 | 1/1980 | Kitamura | 236/48 R |
| 4,239,152 | 12/1980 | Kitamura et al. | 236/48 R |

*Primary Examiner*—William E. Tapolcai, Jr.

*Attorney, Agent, or Firm*—Sughrue, Mion, Zinn, Macpeak and Seas

[57] ABSTRACT

The thermally responsive valve device is comprised of a body having three passages therein, the first of which is adapted to be conected to a vacuum source while the second and third passages are each adapted to be connected to a suitable fluid operated device. The first passage is in constant fluid communication with two spaced apart fluid chambers within the body while the second and third passages are in selective communication with said chambers respectively. A valve member is located in each chamber for controlling communication of the second and third passages with their respective chambers. A pair of snapacting bimetallic disks are mounted in spaced relation within a third chamber in alignment with each other and each valve member. An operating rod is disposed in operative engagement between one of said disks and one of said valve members and a hollow tubular sleeve concentric with said rod is disposed in operative engagement between the other of said disk and the other of said valve members. A spring is operatively associated with each valve member for biasing the respective valve member toward said bimetallic disk to allow communication between said first passage and said second and third passages.

3 Claims, 1 Drawing Figure

U.S. Patent  Mar. 30, 1982  4,322,032
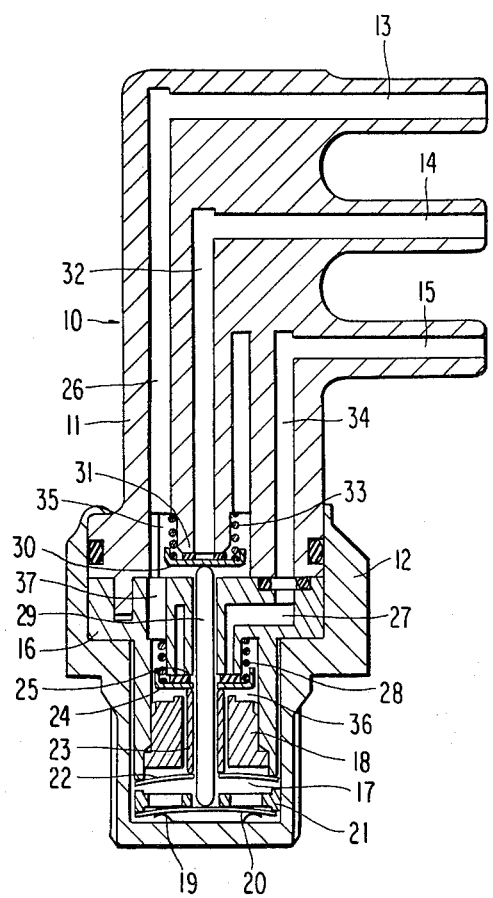

THERMALLY RESPONSIVE VALVE DEVICE

BACKGROUND OF THE INVENTION

1. Field of the Invention

The present invention relates to thermally responsive valve devices and more particularly to thermally responsive valve devices which provide on-off control for fluid passages in conjunction with the snap-acting movements of bimetallic disks which change their curvatures in response to variations in temperatures.

2. Prior Art

It is rather well known in the art to provide thermally responsive valve devices wherein a circular dish-shaped thermostatic bimetallic disk is provided which will snap over center in response to a variation in temperature to thereby control the fluid passage in an on-off manner. However, such prior thermally responsive valve devices have been designed and arranged wherein a single bimetallic disk controls a single fluid passage. Therefore, in those cases where it is desired to control two independent fluid passages, two separate and independent thermally responsive valve devices must be utilized. This duplication of structure results in higher costs and excessive crowding within the limited space available in a vehicle engine compartment.

SUMMARY OF THE INVENTION

The present invention provides an improved thermally responsive valve device which obviates the various drawbacks of the prior art devices described above.

The present invention provides an improved thermally responsive valve device wherein fluid communication between a first passage and two separate independent fluid passages, respectively, is provided within a single valve body under the control of two independent thermally responsive bimetallic elements located in a common heat responsive chamber within the same valve body.

The foregoing and other objects, features and advantages of the invention will be apparent from the following more particular description of a preferred embodiment of the invention as illustrated in the company drawings.

BRIEF DESCRIPTION OF THE DRAWING

The sole FIGURE is a cross-sectional view of the thermally responsive valve device according to the present invention.

DETAILED EXPLANATION OF THE INVENTION

The thermally responsive valve device according to the present invention can be utilized, for example, within an emission control system for motor vehicles. The valve device 10 includes first and second body portions 11 and 12 sealingly secured to each other. The body portion 11 has a first port 13 which is adapted to be connected to a vacuum source such as the intake manifold of an internal combustion engine. The first body portion 11 is also provided with a second port 14 which may be connected to a fluid operated device such as a wellknown exhaust gas recirculation control valve, and a third port 15 which may be connected to another fluid operated device such as a well-known choke opener. The second body portion 13 has a cup-shaped configuration and a stationary member 15 is secured between the first and second body portions 11 and 12. A stationary member 16 is provided with a cylindrical sleeve portion which extends into the cup-shaped portion of the body portion 12. A separate member 18 is fixedly secured within the end of the cylindrical sleeve portion of the member 15 to define a chamber 17 in the bottom of the cup-shaped body portion 12. The external surface of the cup-shaped body portion 12 is provided with suitable threads for insertion of the body into an engine block so that the chamber 17 in which thermostatic element 20 and 22 are located will be in intimate heat sensing relation with the cooling system of the engine to sense the temperature thereof. The chamber 17 is isolated by the member 18 from the other fluid passages of the valve assembly which will be described herein after.

A first fluid chamber 35 is located in the lower end of the first body portion 11 in constant communication with the passage 26 leading to the first port 13 which is adapted to be connected to the vacuum source. The passage 32, which is in communication with the port 14 connected to a first fluid operated device, is also in communication with the chamber 35 under the control of valve member 30 located within the chamber 35. A spring 33 is located within the chamber 35 for normally biasing the valve member 30 away from the opening of passage 32. A rod 29 is disposed in engagement with the valve member 30 and the bimetallic disk 20 which is supported in the bottom of the chamber 17 within the cup-shaped portion of the housing 12 by means of the spring 19. The rod 29 extends coaxially through the members 16 and 18 so that when the bimetallic disk 20 is in the position shown in the drawing, the rod 29 will force the valve member 30 into engagement with the seat 31 surrounding the passage 32 against the force of the spring 33 to disrupt the communication between the ports 13 and 14.

A second fluid chamber 36 is located within the sleeve portion of the member 16 and is separated from the chamber 17 by means of the member 18 secured within the lower end of the sleeve portion of the member 16. The chamber 36 is in constant communication with chamber 35 through the passage 37 and is therefore in constant communication with the passage 26 leading to the port 13 which is adapted to be connected to the vacuum source. A further passage 27 within the member 16 communicates the chamber 36 with the passage 34 leading to the port 15 which is adapted to be connected to a second fluid operated device. A valve member 24 is provided within the chamber 36 for controlling the communication of the passage 27 with the chamber 36. A spring member 28 is located within the chamber for normally biasing the valve member 24 away from the opening of the passage 27 so that the port 13 will be placed in communication with the port 15 through the passages 26 and 37, chamber 36 and passages 27 and 34. The valve member 24 has central aperture to provide for the passage of the rod 29 therethrough. A hollow tubular sleeve 23 surrounds the lower portion of the rod 29 within the passage through the member 18 for free sliding movement relative to the member 18 and the rod 29. The sleeve 23 is disposed in engagement with the valve member 24 and the bimetalic disk 22 so that when the bimetalic disk 22 is disposed in the position shown in the drawing, the valve member 24 will be biased into engagement with seat 25 surrounding the opening of the passage 27 to disrupt communication between the ports 13 and 15. The bimetalic disk 22 is provided with a central aperture to provide for free movement of the disk 22 and the rod 29 relative each other.

In operation, both bimetalic disk 20 and 22 sense the temperature of the cooling water in the engine which is transferred through the thermally conductive material of the body portion 12. When the temperature of the engine cooling water is relatively low, both of the bimetalic disks 20 and 22 are disposed in their illustrated positions and thus both of the valve members 30 and 24 are maintained in their closed positions. Under these conditions, no vacuum pressure at the port 13 is transmitted to the ports 14 and 15.

When the temperature of the engine cooling water rises to a first predetermined value, the second bimetalic disk 22 will snap from its first or illustrated position into a second position wherein the second bimetalic disk 22 will be provided with a convex configuration directed toward the bottom of the chamber 17. Accordingly, rod 23 and valve member 24 will follow under the influence of the spring 28 so that the valve member 24 is disengaged from the seat 25. The port 15 is now in communication with the port 13 and thus a well-known fluid operated device such as a choke opener will be operated to terminate the lean air-fuel ratio.

When the temperature of the engine cooling water rises to a second predetermined value which is higher than the first predetermined value, the first bimetallic member 20 will snap from its first or illustrated position into a second position wherein the first bimetalic member 20 is provided with a convex configuration extending toward the bottom of the chamber 17. Accordingly, rod 29 and valve 30 under the influence of the spring 33 will follow so that the valve member 30 will be spaced from the seat 31. The port 14 will now be in communication with the port 13 and thus a well-known fluid operated device such as an exhaust gas recirculation controlling valve may be operated to thereby recirculate part of the exhaust gas into the intake manifold.

The coaxial alignment of the valve seat 31, valve member 30, rod 29, valve seat 25, valve member 24, sleeve 23, bimetalic disk 22 and bimetalic disk 20 within the cup-shaped body portion 12 provides an extremely compact efficient arrangement for the control of two separate fluid operated devices utilizing a single vacuum source. The location of the two thermostatically controlled valves within a single housing eliminate the need for an additional housing and cooperating threaded bore in the engine block thereby resulting in a substantial saving in cost as well as space.

While the invention has been particularly shown and described with reference to a preferred embodiment thereof, it will be understood of those in the art that various changes in form and details may be made therein without departing from the spirit and scope of the invention.

What is claimed is:

1. A thermally responsive valve device comprising a body having first and second passages therein, first and second valve seats on said body operatively associated with said first and second passages respectively within said body, first and second snap acting bimetallic disks disposed within said housing for sensing temperature variations therein, first and second valve members disposed within said housing for direct selective contact with said first and second valve seats respectively and first and second rod means disposed between and in contact with said first and second bimetallic disks respectively and said first and second valve members respectively for transmitting movement of said snap acting bimetallic disks to said valve members for selectively opening and closing said first and second passages respectively completely independently of each other, said second valve member and said second bimetallic disk being provided with central apertures therethrough, said rod means associated with said second valve member and said second bimetallic disk having a hollow tubular configuration and the rod means associated with said first valve member and said first bimetallic disk extending through said apertures and said tubular member.

2. A thermally responsive device as set forth in claim 1 wherein said body comprises a cup-shaped end portion within which said valve members, said rod means and said bimetalic disks are located, means within said housing defining first and second chambers in which said first and second valve members are located and a third chamber in the bottom of said cup-shaped portion in which said bimetalic disks are located and a third passage in said body disposed in communication with said first and second chambers.

3. A thermally responsive valve device as set forth in claim 2 further comprising first and second spring means disposed in said first and second chambers in operative engagement with said first and second valve members for normally biasing said first and second valve members away from said first and second valve seats respectively.

* * * * *